W. JOHNSTON.
STARTING DEVICE.
APPLICATION FILED AUG. 15, 1910.
975,134.
Patented Nov. 8, 1910.
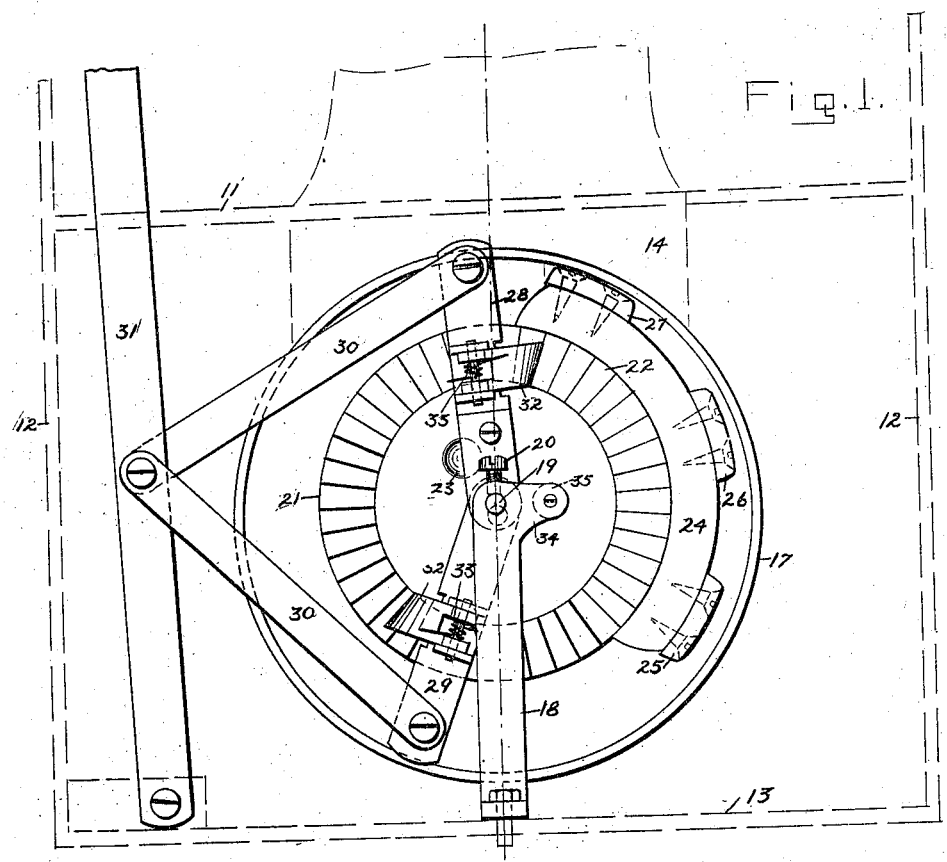
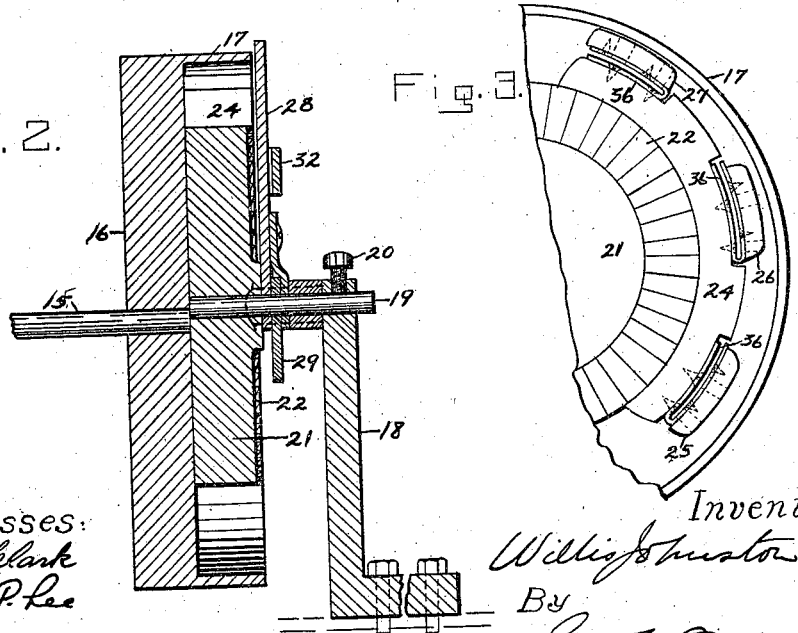
Witnesses:
J. B. Clark
Stanton P. Lee
Inventor
Willis Johnston
By
Geo. Cooper
Attorney.

UNITED STATES PATENT OFFICE.

WILLIS JOHNSTON, OF SCHENECTADY, NEW YORK.

STARTING DEVICE.

975,134.

Specification of Letters Patent.

Patented Nov. 8, 1910.

Application filed August 15, 1910. Serial No. 577,136.

*To all whom it may concern:*

Be it known that I, WILLIS JOHNSTON, a citizen of the United States, and a resident of No. 416 Franklin street, in the city and county of Schenectady, New York, have invented certain new and useful Improvements in Starting Devices, of which the following is a specification.

My invention relates to means for starting or "cranking up" a gasolene motor of the rotary multi-crank type usually employed in automobiles and like vehicles, and in launches and other small boats. In an automobile, e. g., the motor is usually started by manually turning a hand crank connected to the forward end of the crank shaft, which is extended through the end of the crank case for that purpose. This method is both inconvenient and dangerous, in that it is necessary for the chauffeur to leave his seat and stand in front of the vehicle during the operation, and in that the too sudden starting of the motor has been known to strain or break the arm of the operator.

My invention has for its object the provision of safe, simple and efficient means for starting the motor, including a frictional engagement between the crank shaft and the starter; and, in its preferred form, means which can be operated from the chauffeur's seat.

Further objects of the invention will appear in the specification, and be pointed out in the claims.

Figure 1 of the drawings is a rear elevation of a crank-case of an automobile motor provided with my device; Fig. 2 is a vertical section through the plane 2—2, Fig. 1; Fig. 3 is a partial elevation showing a modification.

In the drawings, the parts shown in dash lines and marked 11, 12 and 13 respectively, indicate diagrammatically the floor, side portions and a cross portion of the under body of the car.

14 is the crank case, 15 the crank shaft and 16, the fly wheel at the rear end of the motor, the last two forming part of the "rotor" or rotating part of the mechanism of the explosion motor. The fly wheel is provided with a rearwardly extending concentric flange 17. Mounted on the cross portion 13 of the body or frame of the car is a bracket 18, which carries a short shaft 19, secured in place by a set screw 20, and slightly eccentric of the wheel 16 and flange 17. On the shaft 19 is mounted for free rotation a wheel or disk 21, shown as bearing against the face of the fly wheel 16, and having on its free face a concentric series of radial teeth 22, and, as shown, a slight rounded depression 23. To the outer rim of the disk 21 is secured a concentric segment 24, which carries one or more, in the present instance three, friction blocks, preferably of hard wood, and marked 25, 26 and 27. As a preferred means for rotating the disk 20 and connected parts, I provide two levers 28 and 29, pivoted on the shaft 19, and connected at their outer ends by links 30 to a manual lever 31, which extends upward through the floor 11 of the car. On each of the levers 28 and 29 is a pawl 32 held by a spring 33 in engagement with the teeth 22 on the disk 20. A spring arm 34, secured to or forming part of the bracket 18, carries a rearwardly projecting finger 35, adapted to easily detachable engagement in the depression 23.

Referring to Figs. 1 and 2 of the drawings, the operation of the device is as follows: When the chauffeur desires to start the vehicle, he, sitting in his seat, reciprocates the hand lever 31, which acts, through the links 30, levers 28, 29, and spring pawls 32, to rotate the disk 21 in a clockwise direction. This acts to bring the friction blocks 25, 26, 27 into successive frictional contact with the inner face of the rim or flange 17 on the fly wheel 16 of the rotor of the machine, which is thereby started. When the rotor starts, the frictional contact of the flange 17 with the blocks 25, 26, 27 carries the disk 21 to the position shown in Fig. 1, where the last block 27 is just being disengaged from contact with the flange 17. The impulse thus given, aided by the weight of the segment 24, continues the rotation of the disk until the segment occupies its lowermost position, when all the friction blocks are free from engagement with the flange 17 and the finger 35 rests in the depression 23. It is obvious that during this last described rotation of the disk 21, the levers and links 28 to 31 are unmoved, the pawls 32 clicking over the teeth 22; and also that the disk 21 would remain in its position of rest by gravity, even if the depression 23 and finger 35 were omitted.

All the parts shown in Fig. 3 of the drawings are the same in construction and function as those already described, except that a flat C-spring 36 is interposed between each block 25, 26 and 27, and the segment 24; the operation of the device not being materially changed thereby.

It is obvious that many mechanical alterations may be made in the form of my device, and in the relations of the parts, without departing from my invention, the scope of which is set forth in the annexed claims.

I desire to call particular attention to one feature of the construction shown, which consists in providing two pawls 32 engaging with the teeth 22 on the disk 21; the pawls being mounted on separate levers which extend in opposite directions from their common pivot 19. The advantage of this lies in the fact that if when starting the motor, it "kicks back", that is, starts in the reverse direction, the levers 28 and 29 oppose each other, so that the hand lever 31 is not moved. This obviates the danger of hurting the operator, which danger is always present in the ordinary crank construction. It will of course be understood that with my device as shown, the motor, if it happens to start in the reverse direction, will cause the flange 17 to ride over the friction blocks 25, 26 and 27 against their frictional engagement therewith, and without any movement of the lever 31.

What I claim is:

1. A motor starting device, including a rotor; and a rotatable friction block eccentrically mounted with respect to said rotor and thereby engageable with said rotor during a portion only of the rotation of said block.

2. A motor starting device, including a crank shaft; a fly wheel on said shaft and formed with a concentric flange; and a rotatable friction block eccentrically mounted with respect to said flange and thereby engageable with said flange during a portion only of the rotation of said block.

3. A motor starting device, including a crank shaft; a fly wheel on said shaft and formed with a concentric flange; and a rotatable friction block eccentrically mounted with respect to said flange and having a plurality of bearing surfaces successively engageable with said flange during a portion only of the rotation of said block.

4. A motor starting device, including a crank shaft; a fly wheel on said shaft and formed with a concentric flange; and a rotatable friction block eccentrically mounted with respect to said flange and having a spring supported bearing surface engageable with said flange during a portion only of the rotation of said block.

5. A motor starting device, including a crank shaft; a fly wheel on said shaft and formed with a concentric flange; and a rotatable friction block eccentrically mounted within said flange and thereby engageable with said flange during a portion only of the rotation of said block.

6. A motor starting device, including a crank shaft; a fly wheel on said shaft and formed with a concentric flange; a disk eccentrically mounted with respect to said flange and provided with a series of teeth; a friction block on said disk engageable with said flange during a portion only of the rotation of said disk; and means for rotating said disk including a pawl engageable with said teeth and manual means for reciprocating said pawl.

7. In an automobile, a starting device including a crank shaft; a fly wheel on said shaft and formed with a concentric flange; a rotatable part eccentrically mounted with respect to said flange and carrying a friction block engageable with said flange during a portion of the rotation of said part; and means, including a manually engageable portion above the floor of said automobile, for rotating said part.

8. In an automobile, a starting device including a crank shaft; a fly wheel on said shaft and formed with a concentric flange; a disk eccentrically mounted with respect to said flange and provided with a series of teeth; a friction block on said disk engageable with said flange during a portion only of the rotation of said disk; and means for rotating said disk including a pawl engageable with said teeth and a lever extending above the floor of said automobile for reciprocating said pawl.

9. A motor starting device, including a crank shaft; a fly wheel on said shaft and formed with a concentric flange; a disk eccentrically mounted with respect to said flange, a friction block on said disk engageable with said flange during a portion only of the rotation of said disk; means for rotating said disk; and means for detachably engaging said disk against rotation when said friction block is in its non-operative position.

10. A motor starting device, including a crank shaft; a fly wheel on said shaft and formed with a concentric flange; a disk eccentrically mounted with respect to said flange and provided with a series of teeth; a friction block on said disk engageable with said flange during a portion only of the rotation of said disk; and means for rotating said disk including two levers extending in substantially opposite directions and a pawl on each of said levers engaging with the teeth on said disk.

WILLIS JOHNSTON.

Witnesses:
 GEO. L. COOPER,
 F. A. MICHAEL.